United States Patent
Beshiri et al.

(10) Patent No.: US 7,798,553 B2
(45) Date of Patent: Sep. 21, 2010

(54) LOC-N-LOAD MECHANISM

(75) Inventors: Ilir Beshiri, Windsor (CA); Brian Petelka, Carlisle (CA)

(73) Assignee: Aero-Kit Industries Inc., Burlington, Ontario (CA)

( * ) Notice: Subject to any disclaimer, the term of this patent is extended or adjusted under 35 U.S.C. 154(b) by 81 days.

(21) Appl. No.: 12/241,890

(22) Filed: Sep. 30, 2008

(65) Prior Publication Data

US 2010/0078136 A1    Apr. 1, 2010

(51) Int. Cl.
*B60P 7/04* (2006.01)

(52) U.S. Cl. .................................. 296/100.12; 296/105

(58) Field of Classification Search ................. 296/105, 296/100.12, 100.144, 104
See application file for complete search history.

(56) References Cited

U.S. PATENT DOCUMENTS

| 4,289,346 A | * | 9/1981 | Bourgeois | 296/105 |
| 4,756,325 A | * | 7/1988 | Daniels | 135/88.09 |
| 2003/0067186 A1 | * | 4/2003 | Cramaro | 296/105 |
| 2007/0035153 A1 | * | 2/2007 | Henning | 296/105 |
| 2009/0072576 A1 | * | 3/2009 | LeBlanc et al. | 296/100.12 |

* cited by examiner

*Primary Examiner*—Dennis H Pedder
(74) *Attorney, Agent, or Firm*—Hodgson Russ LLP

(57) ABSTRACT

The invention consists of an automatic lock and tension of a tarpaulin system in a safe manner and does not require the intervention of the operator when the system is being engaged, disengaged, opened or closed.

This invented automatic mechanism tensions the tarpaulin system exerting always a parallel force with the direction of opening and closing of the tarpaulin system eliminating the internal stresses exerted to the tarpaulin system components.

Any misalignment produced due to tolerances is removed from the guide wheels or an edge established under the track of the sliding tarpaulin system.

9 Claims, 10 Drawing Sheets

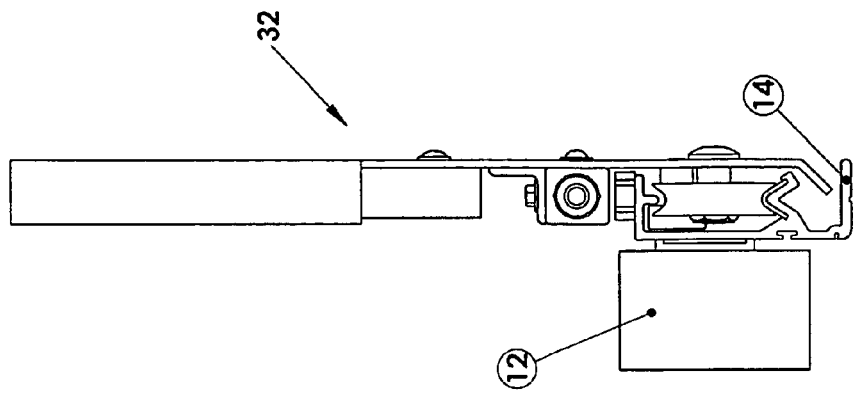
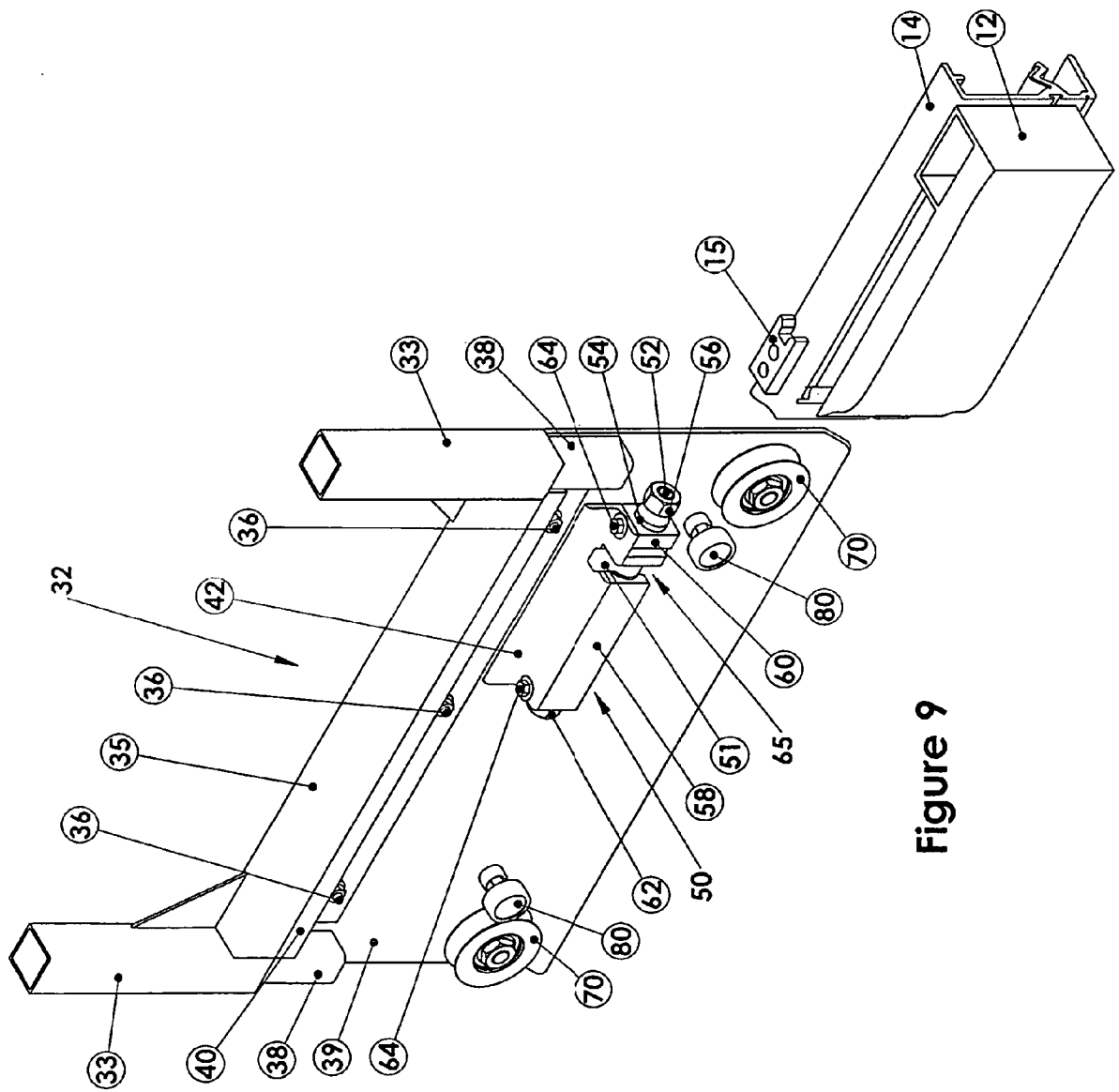

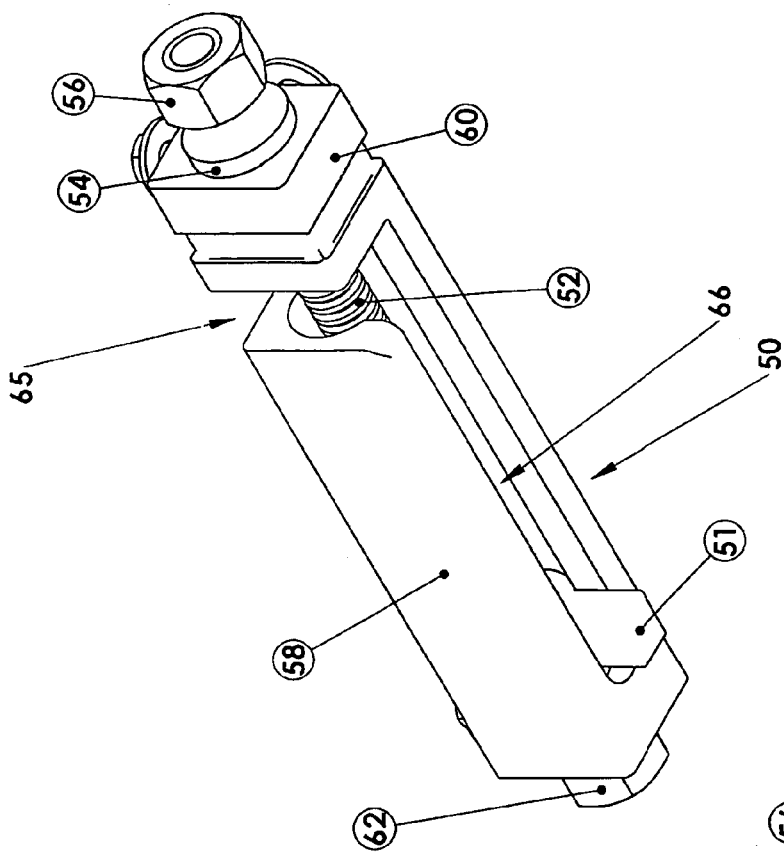
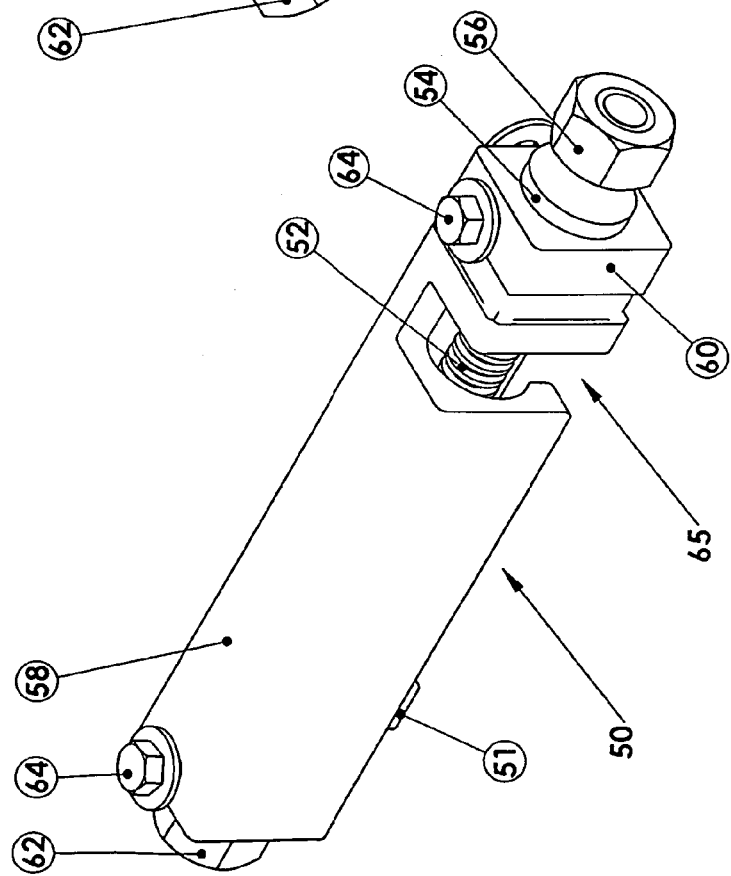

LOC-N-LOAD MECHANISM

FIELD OF THE INVENTION

This invention relates to the field of transportation industry and concerns tarpaulin systems for covering vehicle beds. In particular, it relates to tensioning the tarp of the tarpaulin systems as one of the most important features in this industry.

BACKGROUND OF THE INVENTION

Shipping of goods, both regionally and internationally, is conducted by several means including rail, ship and, very often, truck. While container trucks or truck-trailer combinations are used, particularly in conjunction with rail or ship container shipping, in many places and situations, a standard flatbed truck is used. In order to protect the shipped goods from exposure to the elements, vandalism and theft, they are typically covered with tarps. To prevent the tarpaulin system from opening while the truck is moving, to decrease the aerodynamic drag forces which increase fuel efficiency and to make the system appear attractive by having a tight tarpaulin system, locking and tensioning of the tarp is a necessity.

Also, this tarpaulin system locking and tarp tensioning device called "Loc-N-Load Mechanism" cannot be protrude into the loading area or be any wider than inside cargo space allows, and has to be easy and automatically operated. Above all, the operating of the device has to be safe during engaging disengaging to prevent the operator from having to manually manipulate any part of the locking device where the cargo will be loaded tight to the tarp assembly system frames.

U.S. Pat. No. 6,616,211 and CA Patent No. 2406815 issued to Cramaro Tarpaulin Systems Inc. discloses a tarpaulin tensioning arrangement which selectively is moved to covering and uncovering position. This patent consists of a threaded shaft which when it turns, it displaces a carriage where an exterior plate is mounted. A pivot leg is attached to the exterior plate with a pin. The pivot leg is lifted from a spring when the system is released and it is pulled down manually prior to locking the system. This patented design requires many components. When you engage the leg in the catcher of the system, a manual unsafe operation form the system operator is required by manually lowering the leg down in the operating position to withstand the spring lifting up force. Also, this patented design presented it is very complex and it requires a lot of machining and fabrication.

U.S. Pat. No. 6,511,117 and CA Patent No. 2456448 issued to Aero Industries Inc. discloses a mechanism that removes the slack in the tarp by adjusting the position of an adjusted block by means of turning the screw, where the tarp is attached to the adjusted block. This design may partially remove the slack that may appear in the tarp but it is not able to comply with the requirements that an opening and closing tarpaulin system needs. This invention does not perform the opening and closing of the tarpaulin systems automatically to fulfill the requirements.

Other mechanisms of tensioning and locking of tarpaulin systems that may or may not be in the process of patenting are already used in the tarpaulin market industry from DeMonte Fabricating Ltd., Roll-Tite Inc., Aero Industries Inc., Tarp Stop, Verduyn Tarps Inc. etc.

All of these tarp tensioning and system locking mechanisms are done by means of force exerted in the so-called rear car frame having an aligning angle with the flat bed of the trailer which in itself is projected into a component force in a parallel direction with the trailer or also called the horizontal work force and a vertical component force.

The parallel component force as determined previously is the one that tights the tarp into a preferred position. The unneeded vertical component of the force is the one that pushes the rear car frame up the vertical direction requiring underneath stoppers or wheels to withstand this unneeded force. Also, the force leads to an unneeded torque relative to a pivot point. In this case the pivot point refers to the contact of rolling wheels and the track which are used to open and close the system in all tarpaulin systems. All these factors most often lead to a failure or short lifetime expectancy of the wheels and other tarpaulin system components due to unneeded excessive load. This way of operating the mechanism sustains the components under pressure which leads to a possible failure of these components which means failure of the system assembly.

All the mechanisms as disclosed require taking payload space, and intervening of the operator in the transition operations of the mechanism: opening, operating, and closing the system. When the systems are prepared for tarp tensioning operation, an operator action is required to engage the mechanism by overcoming the resistance force of the spring, a magnetic field or other mechanical forms.

All the disclosed mechanisms fail to have a complete automatic process of opening, operating and closing the tarp system. They all require interventions of the operator as a necessity to fully perform what is required from the lock and tension devices.

All the disclosed tarp tensioning and locking mechanisms are complex, too many components and have a high price tag that the said tarp industry cannot afford. There is a need in tarp and trucking industry to address these issues that exist with tensioning and locking of the tarp systems.

It is an object of this presented invention to partially or completely fulfill one more of the above-mentioned needs.

SUMMARY OF THE INVENTION

The invention consists of a mechanism that is used to tension the tarp of the tarpaulin system by means of a force exerted from the mechanism longitudinally parallel with the direction of the movement of the truck and any deviation from this direction is taken up from the gravity wheels inserted under the track or by other means that withstand that action.

The invention further consists of having an important safety advantage for all the processes involved in the operating of a tarpaulin system. Setting up the tarp system for closing procedure, tensioning and locking the system are automatic operations and they do not require operator intervening to prepare the mechanism prior to locking the system in place to prevent it from opening.

Another object of the invention is having less operating steps of the mechanism to fully perform its function with less amount of components.

The invention includes a mechanism that a) is bolted to Rear Car Assembly in two directions to secure it in place. b) Has an acme, square or buttress threaded shaft used to thrust the load (Rear Car) c) Has a threaded round thrust nut i) with the same respective thread to fit the threaded shaft ii) with a thrust tip part on it in radial direction with the thrust nut.

d) A cylinder housing that could be i) a drilled and bored rectangular bar with welded shaft supports in the end or ii) round tubing where shaft thread supports are welded to support the threaded shaft.

e) During the tarp system tensioning procedure by turning the tightening nut i) manually ii) by power tool, the thrust nut, which is attached to the shaft, comes to a halt from a stopper attached to the rail or from a number of slots in the rail by forcing the whole Rear Car Assembly and tarp to be displaced simultaneously.

f) During the opening procedure, the thrust nut travels in the opposite direction with the movement of the truck guided by a slot until it reaches the transition slot. Using the self-internal resistance between threads of the shaft and thrust nut, and the resistance created between the side face of the thrust nut and a collar placed in the shaft by any means of any mechanical connection, guided from the transition slot it turns 180 degrees in vertical position while the thrust shaft is still turning.

This allows the tarp system to have degree of freedom both directions (open and close) from the locking position caused by the stopper or from the slot in the rail of the system.

All operating steps are performed automatically by turning the thrust shaft and does not require and extra manual steps.

The shaft assembly is designed in such a way that it can be replaceable without damaging the housing of the Loc-N-Load Mechanism.

Other and further advantages and features of the invention will be apparent to those skilled in the art from following detailed description thereof, taken in conjunction with the accompanying drawings.

BRIEF DESCRIPTION OF THE DRAWINGS

The invention will now be described in more detail, by way of example only, with reference to the accompanying drawings, in which like numbers refer to like elements, wherein:

FIGS. 9 and 10 are perspective views that illustrate opened position of tarpaulin system with the invented mechanism.

FIGS. 11 and 12 are perspective views that illustrate the present invention in itself

DETAILED DESCRIPTION OF THE PREFERRED EMBODIMENTS

A presently preferred embodiment of the inventive system presented herein consists of a mechanism that locks the sliding tarpaulin in place and tensions the tarp of the tarpaulin system.

Figure 1:
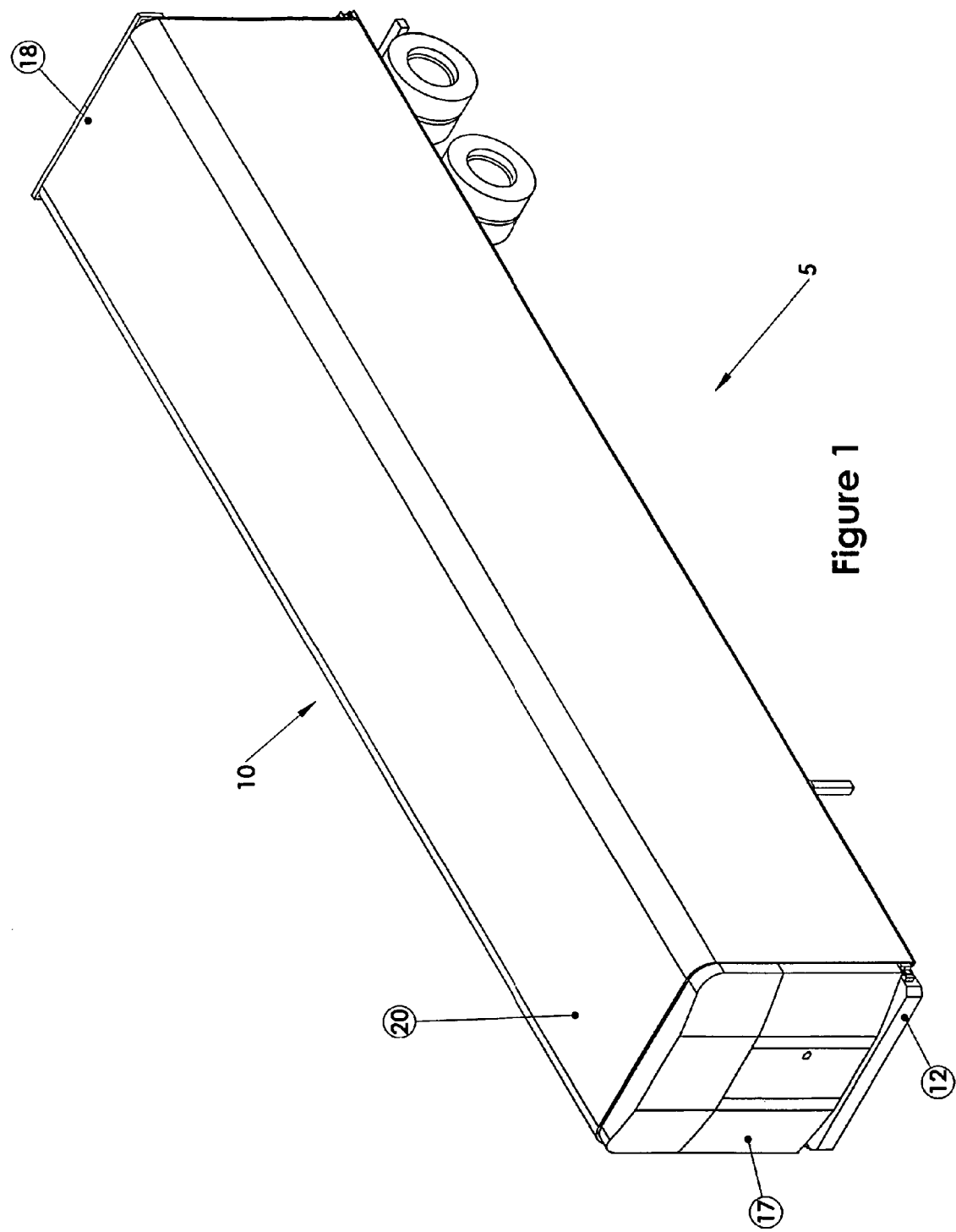
FIG. 1 is a three dimensional drawing of a flat bed closed (tensioned) sliding tarpaulin system where the "Loc-N-Load Mechanism" invention is used to lock and tension the system.

FIG. 1 represents a general view that illustrates a standard complete flatbed trailer 5 with trailer and sliding tarpaulin system on it 10. The view in details demonstrates the components of the system 5 and relative location of the main components respectively the trailer 12, the headboard 17, the tarp 20 and the rear flap 18. As shown, the trailer 12 is covered with the sliding tarpaulin system 10. The present invention locks the sliding tarpaulin system and tensions the tarp. The principles of the present invention can be used in all tarpaulin systems. However, some modifications to Install the Lock-N-Load Mechanism may be required due to Car Assembly configuration.

Figure 2:
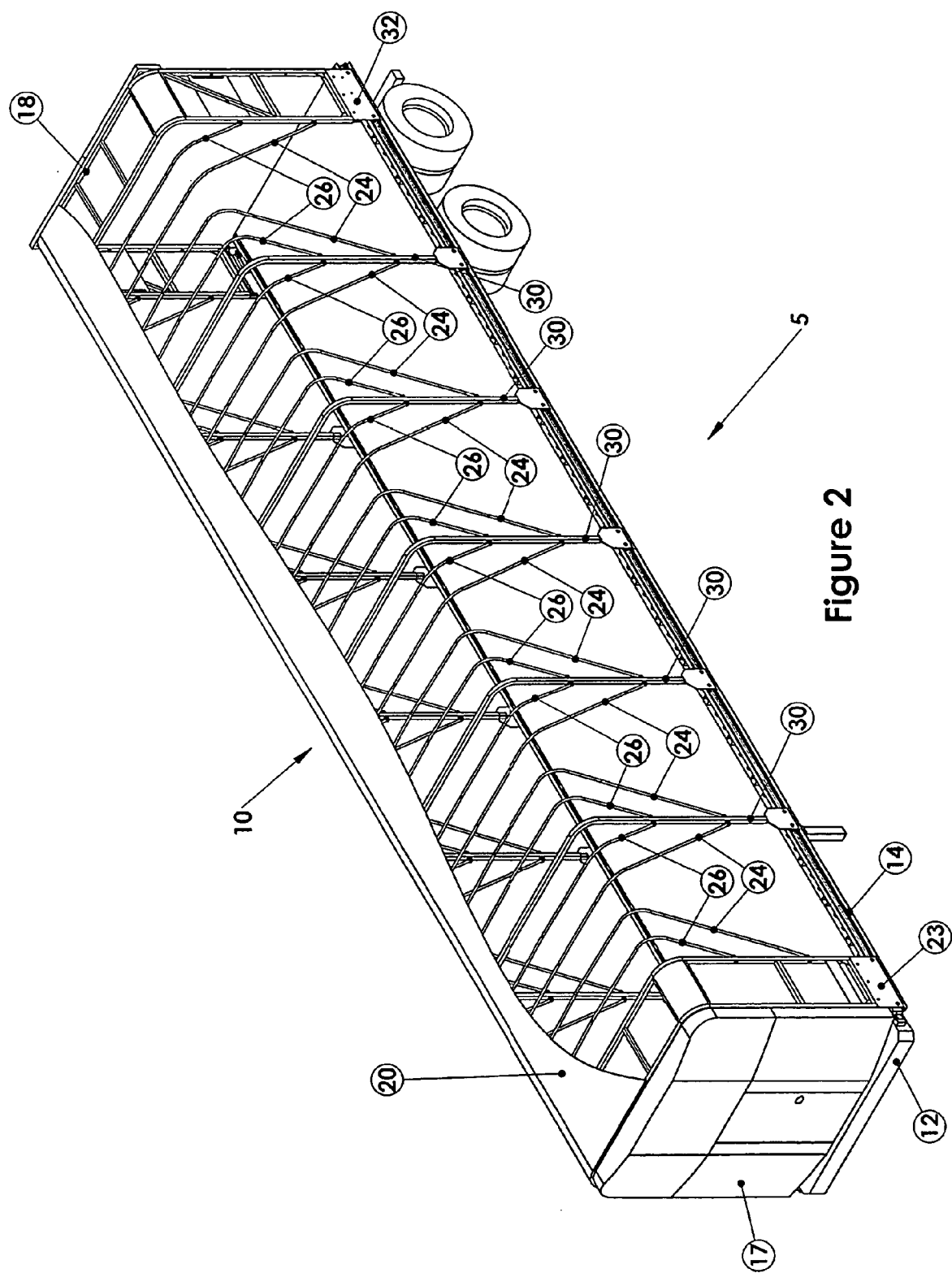
FIG. 2 is a three dimensional of a flat bed trailer with tensioned sliding tarpaulin systems in it, with the present invention, where the drawing is section cut to allow the internal parts of the tarpaulin system to be shown.

FIG. 2 illustrates the sliding tarpaulin system 10 and its components. The drawing shows the tarp partially cut to allow the components to be seen in the functioning position while the system is closed and the tarp is in tensioned position. The system as shown consists of a number of frames assemblies called intermediate cars 30 (usually five) front car 23, and rear car 32. Wheels 70, 70 mounted at the end of these frames, allow the system to slide in the rail 14 where the rail 14 is bolted to the flat bed trailer 12. The sliding tarpaulin system can be open from the front where headboard 17 is mounted or from the back by pushing the rear car 32. When the system opens from the back, the rear flap 18 is lifted up opened, after that the rear car 32 is pushed causing the double uplift 24 and/or quad uplift 26 to rotate relative to pivot points located in the car frames. On the other side, these uplift are attached to tarp 20, thus the tarp gets pushed up in a vertical position. When the rear car 32 reaches the closed intermediate car 30, they slide simultaneously till the next intermediate car 30 is reached by causing the sliding tarpaulin system 10 to further open. This process repeats till the front car 23 is reached and the sliding tarpaulin system 10 is fully opened.

The sliding tarpaulin system 10 if opened from the front is achieved from reliving the front car 24 from the headboard 17 and pushing it back in the same manner till the rear car 32 is reached.

Figure 3:
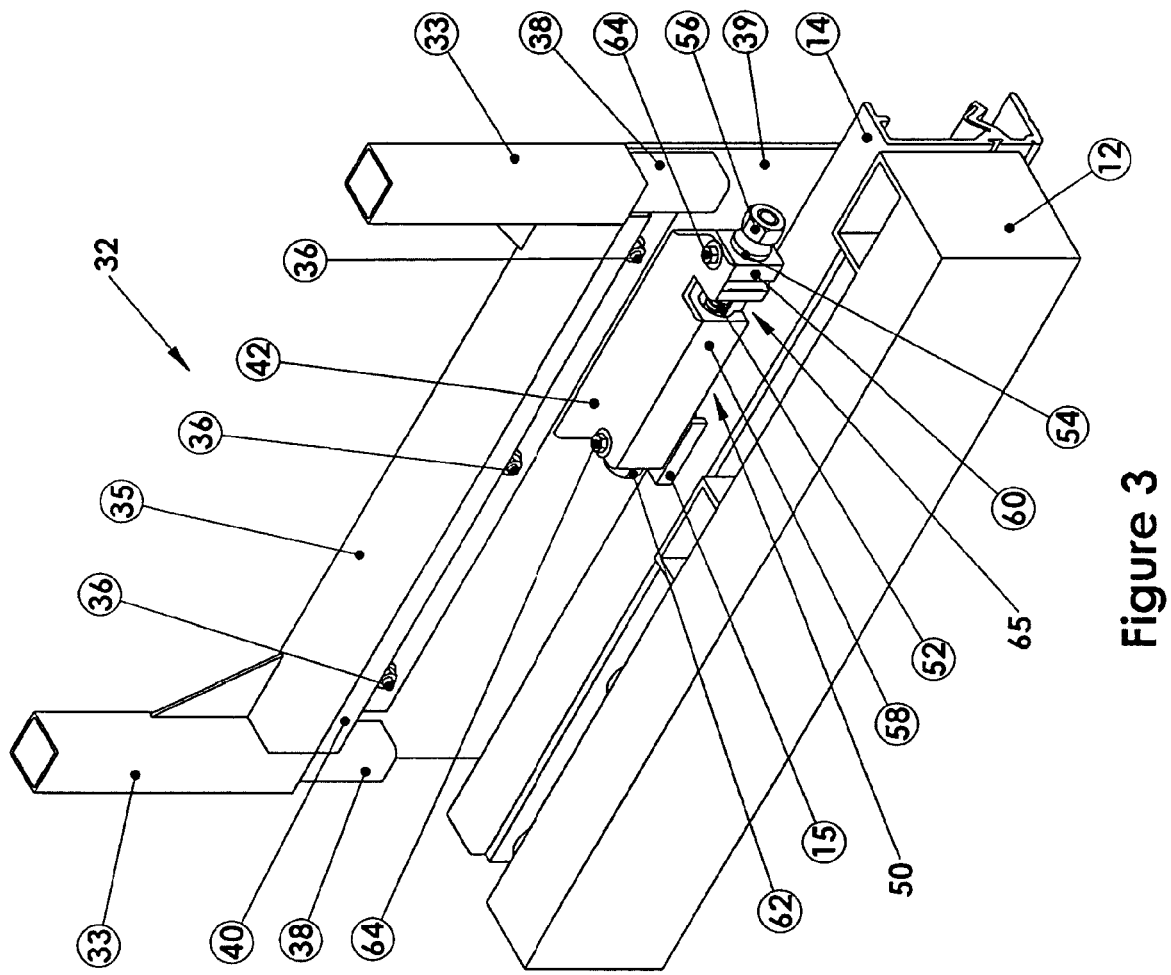
FIG. 3 is a perspective view of the present invention accompanied with further embodiment of this invention.

As it is shown in FIG. 3 the invented Loc-N-Load Mechanism 50 is in the position where it has locked the sliding tarpaulin system 10 and tensioned the tarp 20. The tarp 20 is attached to the bow 33 of the rear car 32 with bolts or other means. The bows 33, 33, 35 which represent a cut section of the rear car frames, slide through the U-channels 38,38, supported from reinforcing tube 40, connected with bolts 36, 36, 36 bolted to the rear car plate 39. The present invention Loc-N-Load Mechanism 50 is connected with bolts 64, 64 to the L-angle 42 which is welded to the rear car plate 39 and bolts 90, 90 to the rear car plate 39. The whole system is locked in place from the contact of the mechanism 50 to the system stopper 15 where in itself is welded or bolted to the rail 14.

Figure 4:
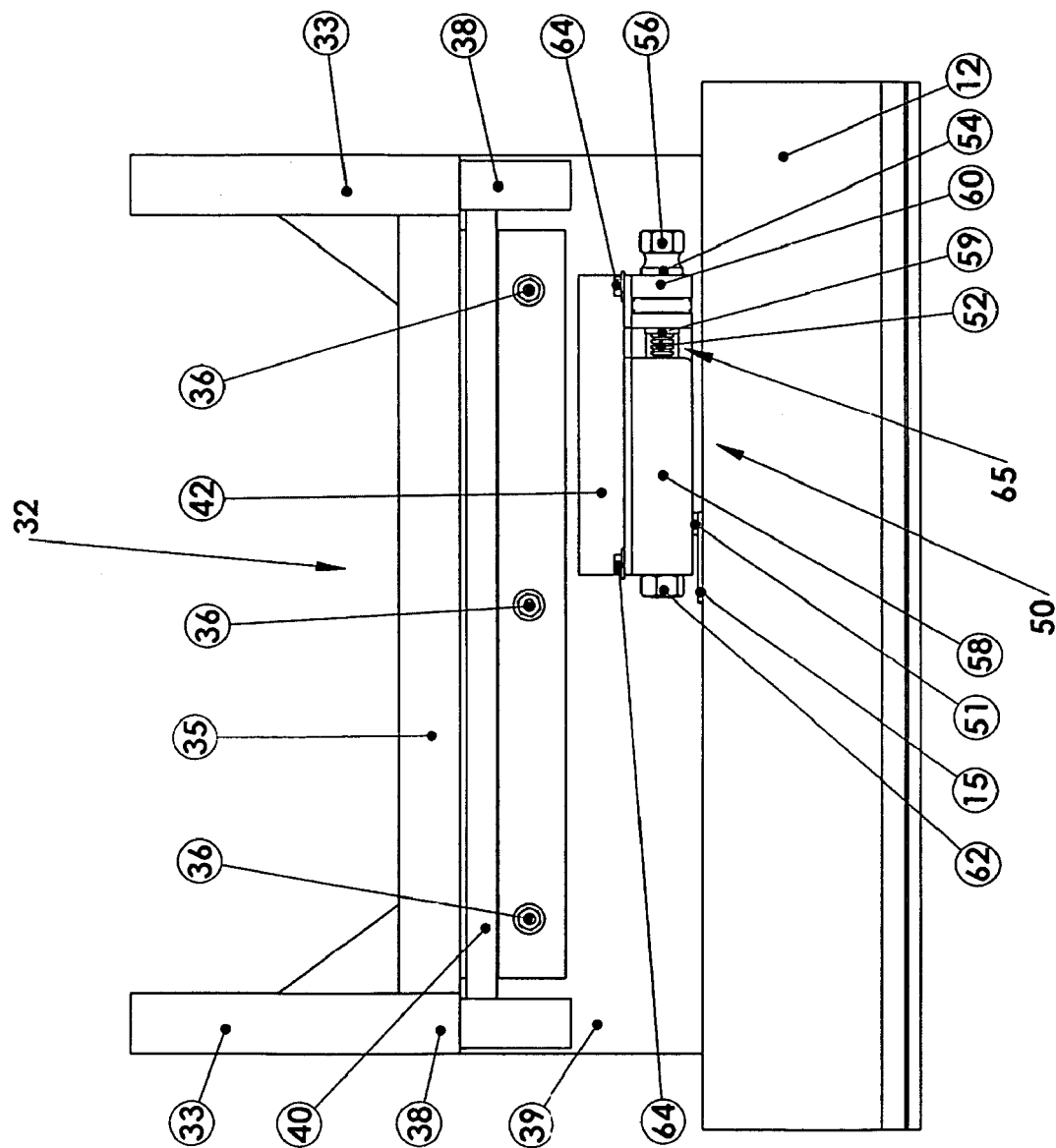
FIG. 4 a side perspective view of the invention to demonstrate the locked position of the tarpaulin system by means of the present invention.
Figure 6:
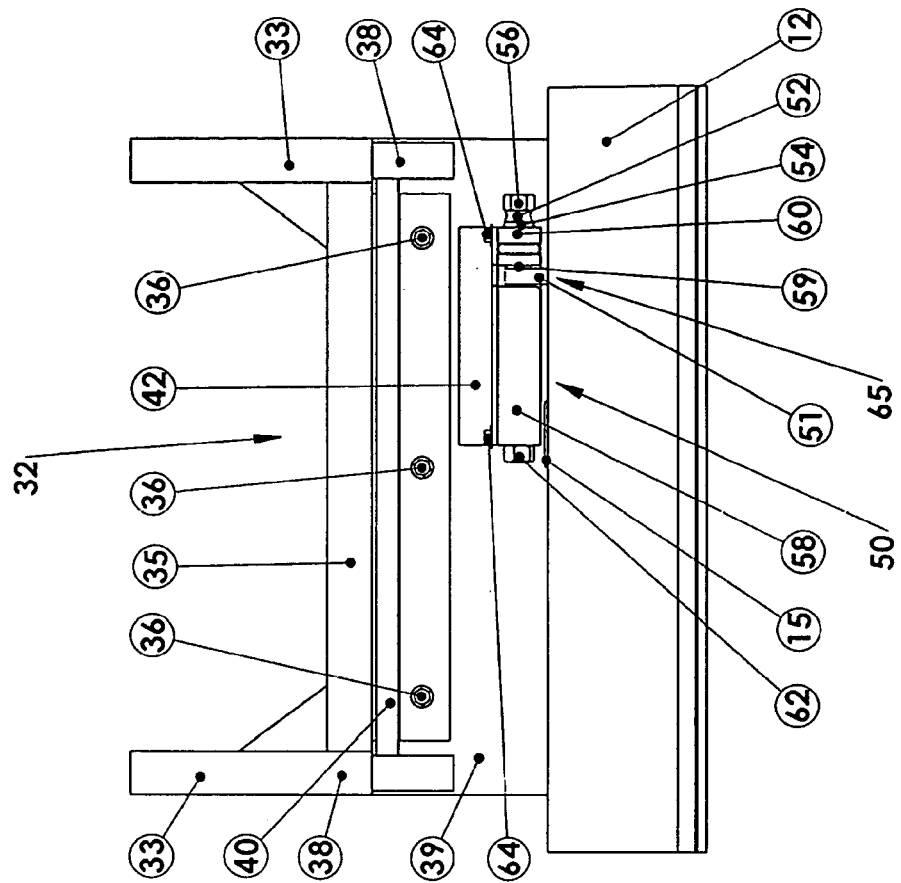
FIGS. 5 and 6 are perspective views of present invention presenting transition process just prior to disengaging the tarpaulin system from lock and tarp tension position.
Figure 5:
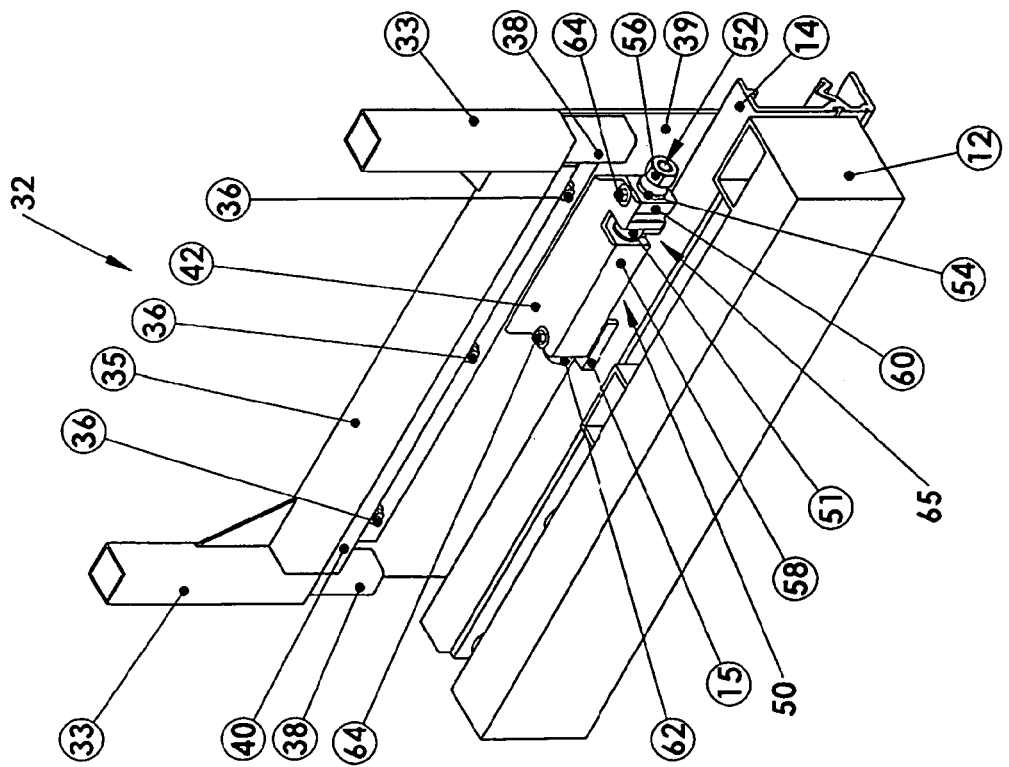

FIG. 4 is a continuity of FIG. 3 and its purpose is to better demonstrate the lock of sliding tarpaulin system 10. As indicated, the welded or bolted system stopper 15 maintains the thrust nut 51 in a static position causing the sliding tarpaulin system 10 to hold the desired locked sliding tarpaulin system 10 and tension tarp 20.

FIG. 5, FIG. 6, FIG. 11, FIG. 12 illustrate the procedure of opening the sliding tarpaulin system 10. Turning of the nut 52 in clockwise direction by means of a manual wrench or power tool causes the tarpaulin 20 to release from tensioning and it prepares the sliding tarpaulin system 10 from opening which causes the trailer 12 to uncover from sliding tarpaulin system 10. In this case, the thrust shaft assembly 53 pushes the thrust nut 51. While the nut 52 keeps turning, the stop spacer 54 does not allow the shaft assembly 53 to slide through thus causing the thrust nut 51 to travel in the slot 66. The slot 66 maintains the thrust nut in the desired position preventing it from turning till it reaches the transition slot 52. While this process is happening, simultaneously the thrust nut travels in the back direction of the trailer 12 and the Loc-N-Load Mechanism 50 and the whole sliding tarpaulin system 10 travel in the other direction (front trailer direction) causing loosing of the tarp and preparing for the system opening process.

Figure 8:
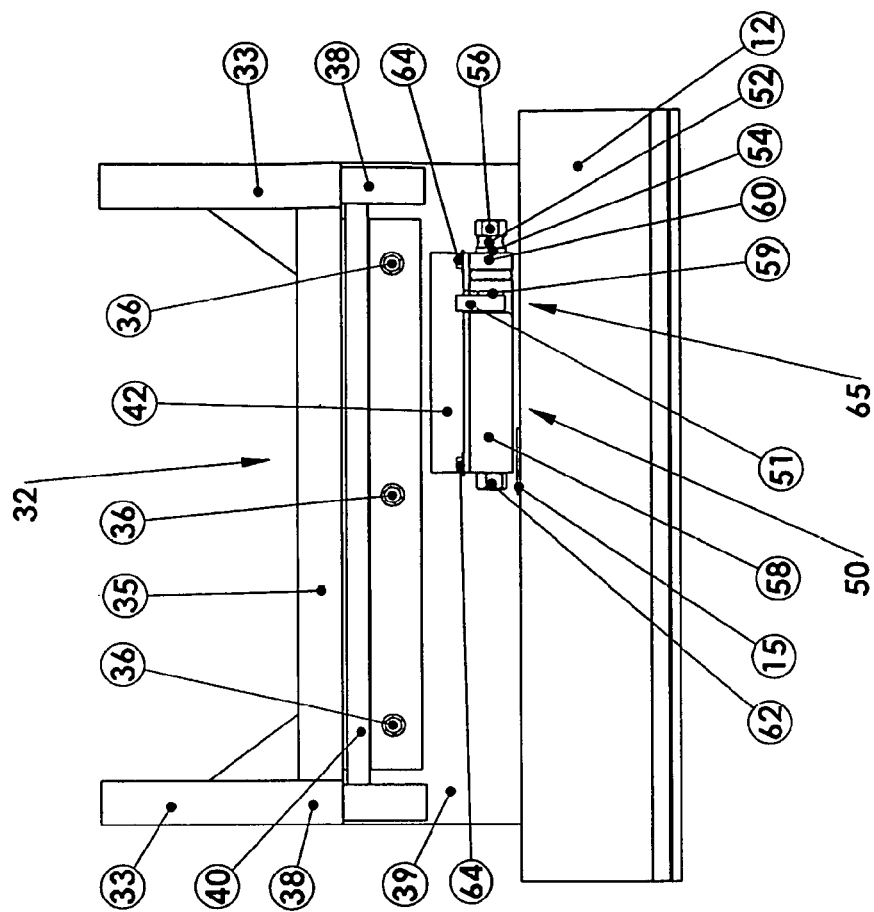
FIGS. 7 and 8 are perspective views of present invention that demonstrate the fully disengaged position of the invention.
Figure 7:
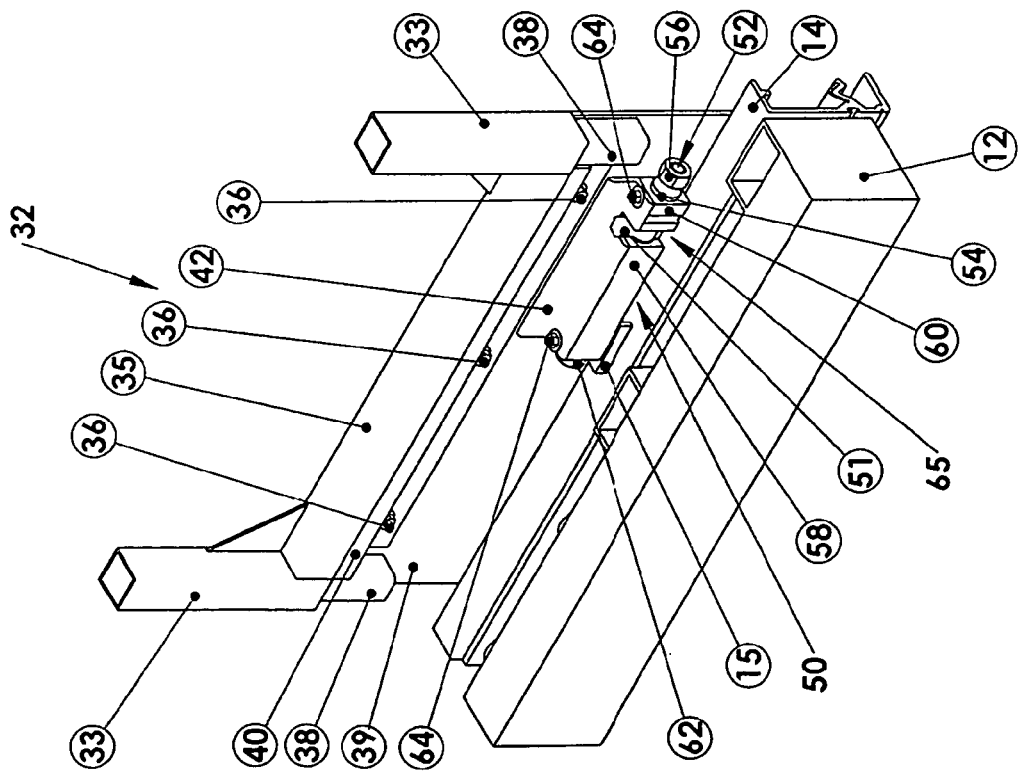

When the thrust nut 51 travels till it reaches transition slot 65, as it's shown in FIG. 7 and FIG. 8, thrust nut turns 180 degrees using the resistance between the threads and the collar, from downward lock position cam following the shape of the transition slot 52 and releasing the sliding tarpaulin system from locking position.

While the thrust nut is up and the sliding tarpaulin system 10 is released, as illustrated in FIG. 9 and FIG. 10, the operator manually pushes the tarpaulin system 10 towards the front of the trailer 12 causing the system to open and the trailer to uncover from the sliding tarpaulin system 10. For practical reasons if an unnecessary small torques is created, to prevent the rear car 32 from tipping over; the rolling wheels 80, 80 or other means are used.

The tightening of the sliding tarpaulin system 10 is performed in the opposite way of opening. The system is pulled back when the thrust nut 51 passes the system stopper 15. Any time after this stage, the operator starts turning nut 56 manually or by using power tools in the counterclockwise direction. The thrust nut that presently sits in up vertical position turns down 180 degrees till it is stopped from the slot 66. The nut 62 maintains the thrust shaft in position while the locking and tensioning of the sliding tarpaulin system 10 starts. The assembly thrust shaft 53 and the thrust shaft 52 are supported by the housing 58 and support 60 where they are welded together.

While the operator keeps turning nut 56, the thread of the thrust nut 51 that is stopped from the system stopper 15, pushes thrust shaft 52. The spacer 54 prevents the shaft assembly 53 from sliding out of the housing assembly 57 causing the whole housing assembly along with the rear car 32 to be pushed in the rear direction of the trailer. This causes the tarp 20, which is attached to the rear car 32, to tension till a desired stretch of the tarp 20 is achieved. This achieved position is also the locking position of the sliding tarpaulin system 10.

Figure 13:
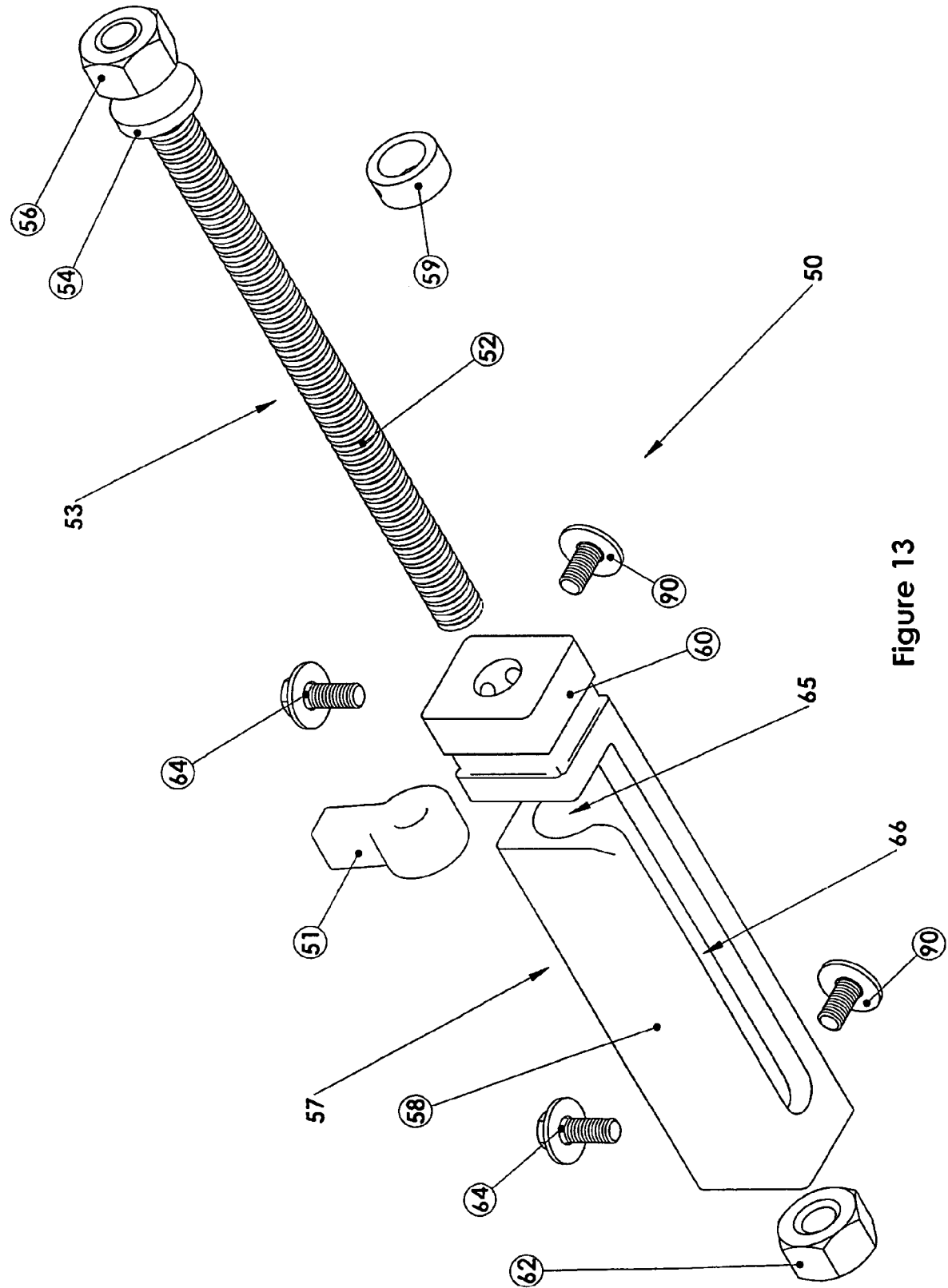
FIG. 13 is a perspective view of a dismantled present invention

FIG. 13 illustrates an explored view of the present invention. It shows the shaft assembly 53, the thrust shaft 52, the tightening nut 56, and stop shaft spacer 54 where the nut 56 and the stop spacer 54 are welded together; the housing assembly 57, the lift collar 59, the housing 58, the shaft support 60 which is welded to the housing 58. The thrust shaft assembly 53 slides in the hole of the housing and just before it reaches the transition slot 65, the thrust nut 51 is inserted into the slot 65 and the shaft 52 is threaded into the thrust nut 51. When the spacer 54 reaches the support shaft 60 of the assembly housing 57, a nut 62 is threaded into the shaft 52 as shown. The bolt 64 and 90 are mounted in place while the loc-N-Load Mechanism is being assembled.

Figure 15:
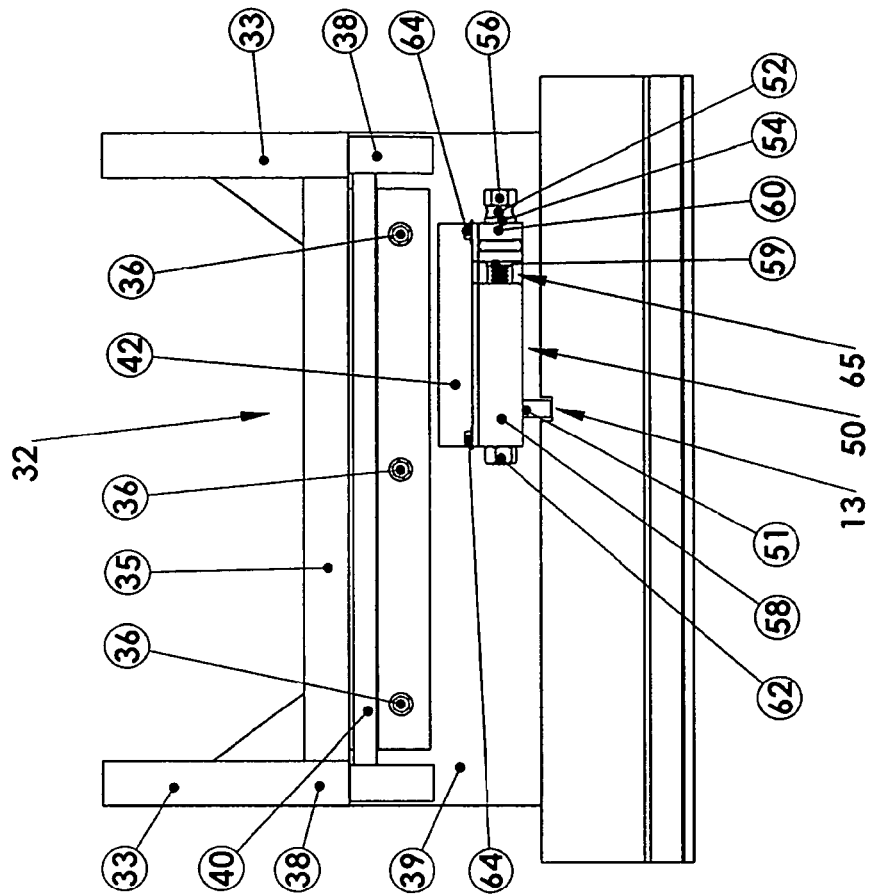
FIGS. 14 and 15 is a perspective view of another option of the invention where the system is locked in the rail of the system.
Figure 14:
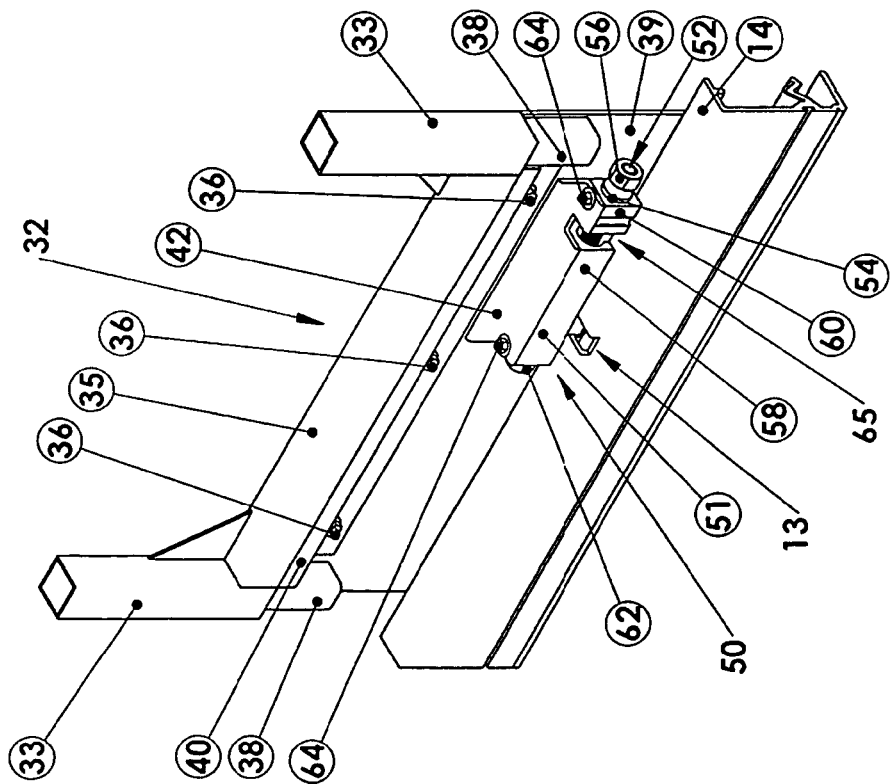

The locking of the sliding tarpaulin system 10 is done in a variety of ways. FIG. 14 and FIG. 15 illustrate an option where the sliding tarpaulin system 10 is locked in place by means of a recess locking slot 13 cut of the rail 14. The system locking slot keeps the thrust nut 51 in a fixed position by locking the sliding tarpaulin system 10.

What is claimed is:

1. A device for tensioning a sliding tarp system on a truck flatbed, comprising:
    a thrust nut threadedly attached to a threaded shaft, the thrust nut contained within a housing;
    wherein the housing has a channel along which the thrust nut is guided during operation of the device, and wherein the housing further has a transition slot for receiving the thrust nut;
    a tensioning nut attached to the threaded shaft at an end which lies outside of the housing;
    wherein the housing is connected to a frame assembly, and a tarp is connected to the frame assembly;
    wherein during operation of the device, the tensioning nut is turned to allow the thrust nut to release from the transition slot and to travel along the threaded shaft and engage with a stopper attached to the rails thereby moving the housing and frame assembly along rails attached to the truck flatbed, the housing and frame assembly moving in a direction parallel to the direction of truck travel;
    thereby allowing tensioning of the tarp.

2. The device of claim 1, further comprising a retaining nut attached to the threaded shaft distal to the tensioning nut, the retaining nut preventing the threaded shaft from exiting the housing in the direction of truck travel.

3. The device of claim 1, further comprising rolling wheels attached to the frame assembly to prevent torque.

4. The device of claim 1, wherein the stopper is a notch in the rail.

5. The device of claim 1, further comprising a lift collar which guides the thrust nut into the transition slot.

6. The device of claim 1, wherein the housing is rectangular in shape.

7. The device of claim 1, further comprising a stop spacer adjacent to the tensioning nut.

8. The device of claim 1 wherein the thrust nut is rotated 180 degrees from the transition slot to the channel in the housing.

9. A method of tensioning a sliding tarp system on a truck flatbed, comprising the steps of:
    providing a thrust nut attached to a threaded shaft, the thrust nut contained within a housing, wherein the housing has a transition slot for receiving the thrust nut, the housing attached to a frame assembly and a tarp is attached to the frame assembly;
    turning a tensioning nut attached to the threaded shaft at an end which lies outside the housing, thereby releasing the thrust nut from the transition slot and guiding the thrust nut along a channel in the housing;
    engaging the thrust nut on a stopper attached to rails, the rails attached to the truck flatbed, whereby engagement of the thrust nut on the stopper moves the housing and frame assembly in a direction parallel to the direction of truck travel thereby tensioning the tarp.

* * * * *

UNITED STATES PATENT AND TRADEMARK OFFICE
CERTIFICATE OF CORRECTION

PATENT NO. : 7,798,553 B2 Page 1 of 1
APPLICATION NO. : 12/241890
DATED : September 21, 2010
INVENTOR(S) : Beshiri et al.

It is certified that error appears in the above-identified patent and that said Letters Patent is hereby corrected as shown below:

Title page, item (73), the Assignees should read:

-- Aero-Kit Industries Inc., Burlington, Ontario (CA); and
Iles Professional Engineering Corporation, Windsor, Ontario (CA) --.

Signed and Sealed this
Thirty-first Day of July, 2012

David J. Kappos
*Director of the United States Patent and Trademark Office*